Figure 1:
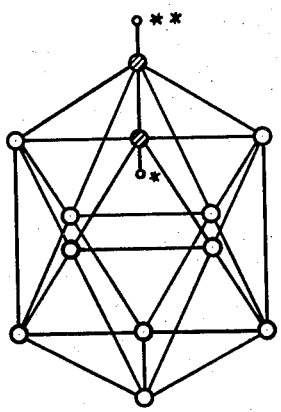

Feb. 11, 1964     T. L. HEYING     3,121,118
PROCESS FOR THE PREPARATION OF CARBORANE DIOLS
Filed Dec. 26, 1961

O   BORON

⊘   CARBON o   HYDROGEN ON CARBON
(HYDROGEN ATOMS ON BORON
OMITTED FOR CLARITY)

FORMULA I

*INVENTOR:*
THEODORE L. HEYING
BY
*Walter D. Hunter*
AGENT

United States Patent Office
3,121,118
Patented Feb. 11, 1964

3,121,118
PROCESS FOR THE PREPARATION OF CARBORANE DIOLS
Theodore L. Heying, North Haven, Conn., assignor to Olin Mathieson Chemical Corporation, a corporation of Virginia
Filed Dec. 26, 1961, Ser. No. 162,282
5 Claims. (Cl. 260—606.5)

This invention relates to the preparation of carborane diols. In the process of this invention carborane diols are prepared by reacting an organoboron compound of the class $RR'B_{10}H_8(CR''CR''')$, wherein R and R' are selected from the group consisting of hydrogen and a lower alkyl radical containing from 1 to 5 carbon atoms, wherein one of R'' and R''' is hydrogen and wherein one of R'' and R''' is an alkenyl radical containing from 2 to 8 carbon atoms, with a mixture of formic acid and hydrogen peroxide, recovering the intermediate product thus formed and hydrolyzing the intermediate product with a lower alkanol solution of an alkali metal hydroxide.

Compounds of the type $RR''B_{10}H_8(CR''CR''')$ wherein R and R' are selected from the group consisting of hydrogen and a lower alkyl radical containing from 1 to 5 carbon atoms, wherein one of R'' and R''' is hydrogen and wherein one of R'' and R''' is an alkenyl radical containing from 2 to 8 carbon atoms can be prepared according to the method described in application Serial No. 75,873, filed December 14, 1960, by Earl W. Cox and Theodore L. Heying. For example, $B_{10}H_{10}CHCCH_2CH=CH_2$, can be prepared by reacting $B_{10}H_{10}CHCH$ successively with phenyl lithium and allyl bromide at a temperature of 0° C. The compound $B_{10}H_{10}CHCH$ can be prepared in the manner described in application Serial No. 813,032, filed May 13, 1959, by John W. Ager, Jr., Theodore L. Heying and Donald J. Mangold.

The drawing is a schematic showing of the structural formula of the compound $B_{10}H_{10}CHCH$.

The solid products prepared in accordance with the method of this invention, when incorporated with suitable oxidizers such as ammonium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechancally strong enough to withstand ordinary handling.

In accordance with this invention it was discovered that carborane diols can be prepared by reacting an organoboron compound of the above class with a mixture of formic acid and hydrogen peroxide, recovering the intermediate product thus formed and finally hydrolyzing the intermediate product with a lower alkanol solution of an alkali metal hydroxide.

In the process of this invention the intermediate product obtained from the reaction of an organoboron compound of the above class with a mixture of formic acid and hydrogen peroxide is separated from the reaction mixture by extraction with a lower dialkyl ether such as, methyl ethyl ether, diethyl ether, n-propyl ethyl ether, di-isobutyl ether, etc. The intermediate product is then recovered from the ether extract by drying of the extract over magnesium sulfate, filtering, and finally, by removal of the extracting agent under reduced pressure. In a like manner the carborane diol product can be separated from the final reaction mixture obtained after hydrolysis.

The ratio of the reactants in the process of this invention can be varied widely. In general, the total combined number of moles of formic acid and hydrogen peroxide in the formic acid-hydrogen peroxide mixture will be from about 5 to about 40 moles or more and preferably from about 5 to 25 moles per mole of organoboron compound of the class $RR'B_{10}H_8(CR''CR''')$ wherein R, R', R'', and R''' have the same meaning as previously set forth and in the formic acid-hydrogen peroxide mixture the mole fraction of hydrogen peroxide will vary from about 0.05 to about 0.25. The concentration of the formic acid and of the hydrogen peroxide employed in the process of this invention must be at least 95 prcent by weight. In the hydrolysis step the ratio of the reactants utilized can likewise be varied widely, generally being from about 0.25 to 10 moles and preferably from about 1.0 to about 5 moles of alkali metal hydroxide per mole of organoboron compound of the above-described class initially charged to the reactor. Sufficient alcohol can be present to produce a solution containing 1 percent alkali metal hydroxide to a saturated solution of alkali metal hydroxide. The reaction temperature can also be varied over a wide range, generally being from 0° to about 150° C. depending upon the particular reaction conditions employed. Although atmospheric pressure reactions are convenient, the reaction pressure can vary from subatmospheric to several atmospheres, i.e., 0.1 to 25 atmospheres. The degree of completion of the reaction can be determined by analysis of the reaction mixture. Generally the reaction requires from about 0.5 to 30 hours or more depending upon the particular reactants employed and the temperature and pressure of the reaction.

Although potassium hydroxide is the preferred alkali metal hydroxide, sodium hydroxide and lithium hydroxide can also be employed in the process of this invention.

The process of the invention is illustrated in detail by the following example.

*Example 1*

24 grams of $B_{10}H_{10}CHCCH_2CH=CH_2$ was dissolved in 75 ml. of formic acid having a concentration of 98 percent by weight and to this solution there was added 4.0 ml. of hydrogen peroxide having a concentration of 98 percent. The cloudy mixture so-obtained was warmed at 55°–60° C. for 2.5 hours at which time the reaction mixture had become clear. Heating was continued for an additional 17.5 hour period at the same temperature and then the solution was poured into 250 ml. of 20 percent sodium hydroxide solution. The resulting mixture was extracted with ether. Next the ether extract was dried over magnesium sulfate, filtered and the ether removed leaving a yellowish solid (M.P. 65–80° C.).

In the next step the solid was dissolved in approximately 60 ml. of absolute ethanol and to this there was added 112 grams of a 10 percent ethanolic solution of potassium hydroxide (0.20 mole). The resulting solution was stirred at room temperature for 2 hours and poured into 200 ml. of water. This mixture was then extracted with ether. The extract was dried over magnesium sulfate, filtered, and the ether was removed leaving a white solid. After recrystallization from refluxing n-heptane, there was obtained 14.9 grams (52.7 percent of the theoretical yield) of

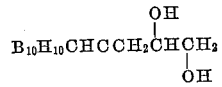

(beta, gamma-dihydroxypropylcarborane), a white, crystalline material which had a melting point of 92–93° C.
The product was identified by infrared anaylsis. In addition it was analyzed for carbon and hydrogen and the following results were obtained:

|  | Percent Carbon | Percent Hydrogen |
|---|---|---|
| Calc'd for $B_{10}C_{18}C_5O_2$ | 27.5 | 8.3 |
| Found | 27.1 | 8.5 |

The compound

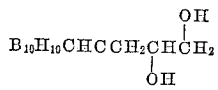

prepared as described in Example I, has the same structural formula as structure Formula 1 shown in FIGURE 1 with the exception that the hydrogen atom indicated by a single asterisk is replaced by the radial

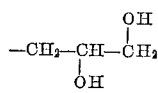

The boron-containing solid material produced by practicing the method of this invention can be employed as ingredients of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artifical resin, generally of the urea-formaldehyde or phenol-formaldehyde type, the function of the resin being given the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

What is claimed is:

1. A process for the preparation of carborane diols which comprises (A) reacting an organoboron compound of the class $RR'B_{10}H_8(CR''CR''')$, wherein R and R' are selected from the group consisting of hydrogen and a lower alkyl radical containing from 1 to 5 carbon atoms, wherein one of R'' and R''' is hydrogen and wherein one of R'' and R''' is an alkenyl radical containing from 2 to 8 carbon atoms with (A) a mixture of formic acid and hydrogen peroxide, (B) recovering the intermediate product formed by reaction of the said organoboron compound with the mixture of formic acid and hydrogen peroxide and (C) hydrolyzing the said intermediate product with a lower alkanol solution of an alkali metal hydroxide.

2. The process of claim 1 wherein the said organoboron compound is:

3. The process of claim 1 wherein the lower alkanol is ethanol.

4. The process of claim 1 wherein the alkali metal hydroxide is potassium hydroxide.

5. The process for the preparation of:

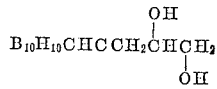

which comprises reacting $B_{10}H_{10}CHCCH_2CH=CH_2$ with (A) a mixture of formic acid and hydrogen peroxide, (B) recovering the intermediate product formed by the reaction of $B_{10}H_{10}CHCCH_2CH=CH_2$ with the mixture of formic acid and hydrogen peroxide and (C) hydrolyzing the said intermediate product with an ethanolic solution of potassium hydroxide.

No references cited.